United States Patent [19]

Someya et al.

[11] Patent Number: 4,536,074
[45] Date of Patent: Aug. 20, 1985

[54] EXPOSURE CONTROL MODE SELECTION DEVICE FOR CAMERA

[75] Inventors: Hiromi Someya; Nobuyuki Suzuki; Toyokazu Mizogui, all of Kanagawa, Japan

[73] Assignee: Canon Kabushiki Kaisha, Tokyo, Japan

[21] Appl. No.: 679,607

[22] Filed: Dec. 7, 1984

Related U.S. Application Data

[63] Continuation of Ser. No. 491,052, May 3, 1983, abandoned.

[30] Foreign Application Priority Data

May 14, 1982 [JP] Japan .................................. 57-81766
May 14, 1982 [JP] Japan .................................. 57-81767

[51] Int. Cl.³ .............................................. G03B 7/097
[52] U.S. Cl. ..................................... 354/442; 354/471
[58] Field of Search ............... 354/442, 443, 465, 471, 354/474, 127.1, 195.13, 289.1

[56] References Cited

U.S. PATENT DOCUMENTS

| | | | |
|---|---|---|---|
| 4,147,420 | 4/1979 | Iwata et al. | 354/127.13 |
| 4,229,092 | 10/1980 | Iwata | 354/195.13 |
| 4,286,849 | 9/1981 | Uchidoi et al. | 354/442 |
| 4,344,681 | 8/1982 | Yamada | 354/442 |
| 4,365,880 | 12/1982 | Kiuchi et al. | 354/442 |
| 4,436,397 | 3/1984 | Kobayashi | 354/465 |

FOREIGN PATENT DOCUMENTS

| | | | |
|---|---|---|---|
| 0024331 | 3/1981 | Japan | 354/474 |
| 0024332 | 3/1981 | Japan | 354/474 |
| 0024333 | 3/1981 | Japan | 354/474 |

Primary Examiner—Russell E. Adams
Attorney, Agent, or Firm—Toren, McGeady, Stanger, Goldberg & Kiel

[57] ABSTRACT

A multi-mode automatic exposure control camera capable of permitting selective switch-over among various exposure control modes is provided with a device which displays each selected exposure mode in the form of a pictograph or the like representing a picture effect obtainable from the selected mode and which also gives a warning through the medium of the displayed pictograph or the like for the object to be photographed when the effect expected from the selected exposure control mode is difficult to obtain.

7 Claims, 13 Drawing Figures

EXPOSURE CONTROL MODE SELECTION DEVICE FOR CAMERA

This is a continuation of application Ser. No. 491,052 filed May 3, 1983, now abandoned.

BACKGROUND OF THE INVENTION:

1. Field of the Invention:

This invention relates to a photographic camera of the kind permitting selection of one of various exposure control modes and more particularly to an exposure control mode selection device which gives a warning when the desired picture image effect corresponding to a selected exposure control mode is difficult obtain.

2. Description of the Prior Art:

As a result of recent advancement of electronic applications in photographic cameras, multi-mode automatic exposure control type cameras, which permit switch-over among various exposure control modes by a selecting operation on an operating member, have been in practice. In regard to pictographs or the like for displays made on photographic cameras on the other hand, cameras using pictographs of mountains or dolls as an indication of distance for visual distance measurement have also been in practice. Use of patterns for indicating flash photography has also been in practice.

However, in exposure control display modes. letters or symbols have been used. In many of the above-stated multi-mode, automatic exposure control cameras, the exposure control modes are indicated by letters or symbols such as M (for manual), AV (for aperture preference AE), TV (for shutter preference AE), P (for programmed AE), etc. With this conventional arrangement, it is difficult to be understand what is indicated by such letters or symbols, particularly for beginners. Beginners are incapable of selecting an adequate aperture value or shutter time suitable for obtaining a desired picture image effect. The image effect varies with the focus depth and shutter time. For people who do not know the interrelation between an aperture value, shutter time, film sensitivity and brightness of an object to be photographed, the relation of a picture effect to the aperture value and shutter time is difficult to understand. Therefore, a mere indication of the exposure control mode in letters or symbols does not let such people readily know an appropriate combination of the shutter time and the aperture value required for obtaining a certain desired picture effect. Besides, the prior art indication can not show a photographing range within which an adequate picture image effect is obtainable. For example, with a symbol A or AV used for indicating an aperture preference mode, it is still unknown what the aperture value should be in order to obtain a pan-focus effect, which gives a photograph with a deep focus depth and which is obtainable by making the aperture smaller. It is also unknown at what range of object brightness the pan-focus effect can be obtained.

To solve this problem, the present inventors have previously proposed an arrangement as disclosed in Japanese Utility-Model Application No. Sho 55-154016 corresponding to U.S. patent application Ser. No. 313,504. According to the proposed arrangement, in order for a beginner to take a photograph considering the picture effect obtainable from a combination of aperture value and shutter time, the camera incorporates therein a program of combinations of aperture values and shutter time values from which various picture effects are derivable. Simple pictographs representative of picture effects obtainable in accordance with the program are shown within a view finder or on the surface of the camera. The simple selection of one of the various pictographs shown on the camera surface enables the photographer to take a photograph with the picture effect represented by the selected pictograph.

It is an object of the invention to provide an improvement on a camera permitting the photographer to obtain a photograph having a desired effect represented by a pictograph with the pictograph selected out of various pictographs. The improvement gives a warning when the desired picture effect cannot be obtained.

It is another object of the invention to provide an improvement on a camera permitting the photographer to obtain a photograph having a desired effect represented by a selected pictograph, the improvment displaying all exposure control modes selectable from various exposure control modes depending on the brightness of the object to be photographed.

These and further objects and features of the invention will become apparent from the following detailed description of preferred embodiments taken in conjunction with the accompanying drawings.

SUMMARY OF THE INVENTION

The invention relates to a camera which permits selection of an exposure control mode from a plurality of exposure control modes. The camera includes display means for displaying the exposure control mode selected and the display means is displayed in a pictograph, a picture effect obtainable from the exposure control mode selected. The camera also includes light measuring means for measuring the brightness of an object to be photographed. The light measuring means produces an electrical signal corresponding to the brightness of the object. Also included are control means for controlling the display action of the display means. The control means receives the signal from the light measuring means and varies the display condition of the display means when the brightness of the object would not give the picture effect expected from the exposure control mode selected.

DESCRIPTION OF THE PREFERRED EMBODIMENTS

Figure 1:
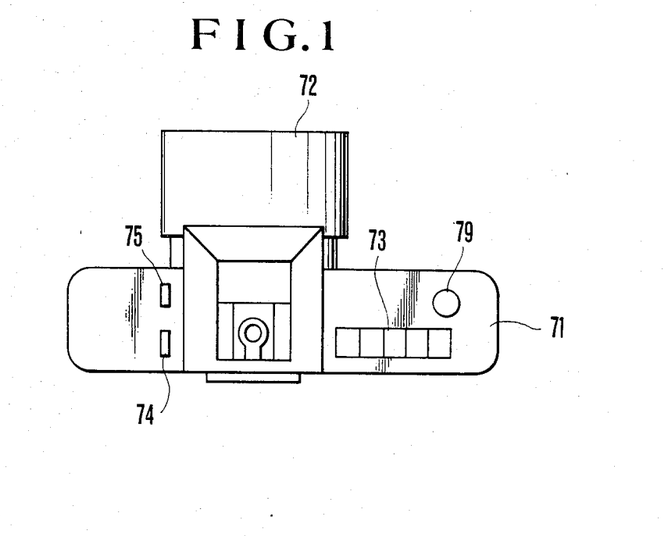
FIG. 1 is a plan view showing a camera in an embodiment of the present invention.
Figure 2:
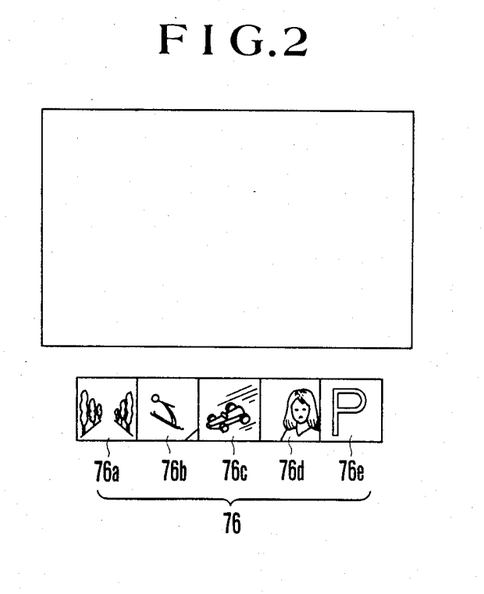
FIG. 2 is an illustration of the visual field of a view finder showing all the mode displays on the camera shown in FIG. 1.
Figure 3:
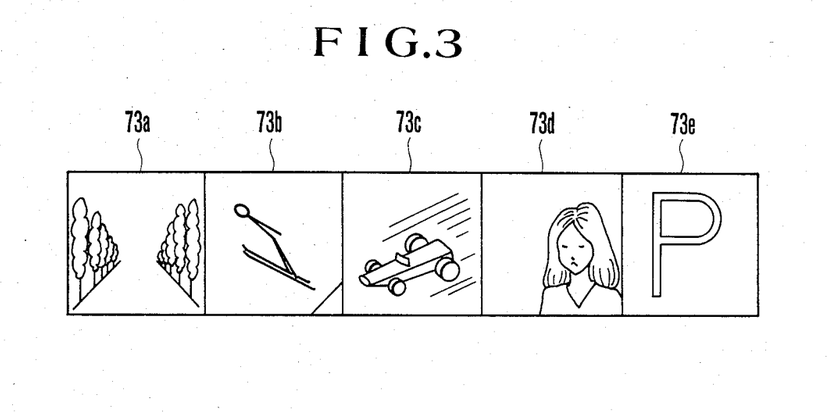
FIG. 3 is a detailed illustration of the external display part of the camera shown in FIG. 1.

With reference to the accompanying drawings, a preferred embodiment of the present invention will be described as follows: FIG. 1 shows the upper surface of the camera. The camera includes a camera body 71; a photo-taking lens 72; and an external display arrangement 73 which displays exposure control modes. For this display, a material such as liquid crystal or the like, that permits electrical control over the transmission factor thereof, is used for the external display arrangement 73. Included in the camera are an exposure control mode selection button 74 which is provided for switch-over between exposure control modes; a light measurement button 75 operated at the time of light measurement; and a release button 79. The visual field of the view finder of the camera shown in FIG. 1 is shown in FIG. 2. Referring to FIG. 2, the view finder is provided with a view finder display arrangement 76 consisting of members made of a material such as liquid crystal that permits electrical control over the transmission factor thereof. The view finder display arrangement 75 makes displays corresponding to those of the external exposure control mode display arrangement 73. In other words, the external display arrangement 73 shown in FIG. 1 shows pictographs 73a, 73b, 73c, 73d and 73e, as shown in FIG. 3. These pictographs 73a, 73b, 73c, 73d and 73e respctively correspond to the pictographs 76a, 76b, 76c, 76d and 76e which are at the view finder display arrangement 76 shown in FIG. 2. The pictograph display part 73a represents an aperture preference mode in which the aperture of the lens 72 is decreased, deepening the focus depth. This aperture preference mode hereinafter will be called a pan-focus mode A. The pictograph display part 73b represents a shutter time preference mode in which a high speed shutter time is used. The shutter perference mode hereinafter will be called stop motion mode B. The pictograph display part 73c represents another shutter time preference mode in which a low speed shutter time is employed for non-stop motion or panning photography, etc. This mode hereinafter will be called a panning shot mode C. The pictograph display part 73d represents an aperture preference mode in which an aperture value on the wider opened side is used for a shallower focal depth. That aperture preference mode hereinafter will be called a graduate mode D. Furthermore, the pictograph or symbol display part 73e represents a standard programmed mode in which combinations of high aperture values and shutter time values to be frequently used are used for photography. This programmed mode hereinafter will be called a normal program mode E.

Figure 4:
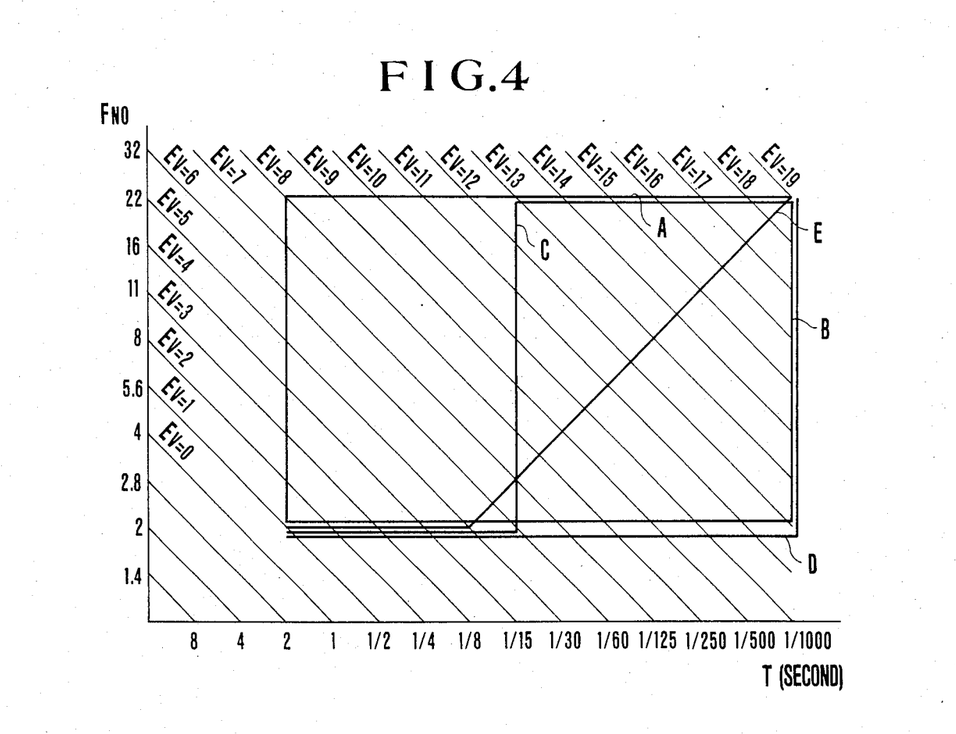
FIG. 4 is an illustration of program lines for various exposure control modes provided for the camera shown in FIG. 1.

Referring now to FIG. 4 which shows the program lines used for the muti-mode automatic exposure control type camera of FIG. 1, the ordinate of the drawing shows aperture values F (or F-numbers) and the abscissa shows shutter time values T. The drawing scale shows EV which corresponds to LV values at ASA 100. In FIG. 4, a reference symbol A indicates the pan-focus mode. In the pan-focus mode A, the shutter time T is 2 and the aperture value F is 2 to 22 within the range of EV values from 1 to 8; and the shutter time T is 2 to 1/1000 sec. The aperture value F is 22 within the range of EV values from 8 to 19. The symbol B indicates the stop motion mode in which the shutter time T is 2 to 1/1000 sec. and the aperture value F is 2 within the range of EV=1-12 while, the shutter time is 1/1000 sec. and the aperture value F is 2 to 22 within the range of EV=12-19. The symbol C indicates the panning shot mode, in which the shutter time T=2-1/15 and the aperture value F=2 within the range of EV=1-6; the shutter time T=1/15 sec. and the aperture value F=2-22 within the range of EV=6-13; and the shutter time T=1/15-1/1000 sec. and the aperture value F=22 within the range of EV=13-19. A symbol D indicates the graduate mode, the diagram of which is identical with that of the stop motion mode B. Another symbol E indicates the normal program mode, in which the aperture value is F=2 and is constant (for EV=1-5) within the range of the shutter time T=2-⅛ sec. On the higher brightness side of the normal program mode E, there are combinations of the aperture value and the shutter time value as represented by a line connecting the point of the aperture value F=2 and the shutter time T=⅛ sec. to a point of the aperture value F=22 and the shutter time T=1/1000 sec. In this specific embodiment, the shutter time values and the aperture values are programmed within the following ranges, which are considered to give various picture effects:

| | |
|---|---|
| A (pan-focus mode): | EV = 13–19, shutter value F = 22 |
| B (stop motion mode): | EV = 11–19, shutter time T = 1/500–1/1000 sec. |
| C (panning shot mode): | EV = 5–14, shutter time T = ½–1/30 sec. |
| D (gradate mode): | EV = 6–13, aperture value F = 2–2.8 |
| E (normal mode): | EV = 1–19 |

With the camera programmed as shown above, the camera photography operations is as follows in cases where, for example the lens 72 of a maximum aperture F=2 and a minimum aperture F=22 is mounted on the camera using a film of sensitivity ASA 100, the focal length of the lens 72 being 50 mm or thereabout: When the main switch which is not shown is turned on, the pictograph display parts 73e and 76e respectively appear at the exposure control mode display arrangement 73 and the view finder display arrangement 76. Then, when the above exposure control mode selection button 74 is depressed once, the pictography display parts 73a and 76a appear respectively at the exposure control mode display arrangement 73 and the view finder display arrangement 76. The pictograph display parts 73e and 76e disappear indicating that the exposure control mode has been switched over from the normal program mode to the pan-focus mode. Then when the exposure control mode selection button 74 is depressed again, the pictograph display parts 73a and 76a disappear while the pictograph display parts 73b and 76b appear to show the switch-over from the pan-focus mode A to the stop motion mode B. Subsequent depressing operations likewise on the exposure control mode selection button 74 then result in shifting of the exposure control mode to the panning shot mode C, graduate mode D and the normal program mode E one after another with the pictograph display parts 73c, 73d, 73e, 76c, 76d and 76e appearing at the exposure control mode display arrangement 73 and the view finder display arrangement 76 showing the exposure control modes one after another. Furthermore, the embodiment may also be such that the exposure control mode, the external exposure control mode display and the view finder display are switched over one after another as the exposure control mode selection button is kept depressed.

Figure 5:
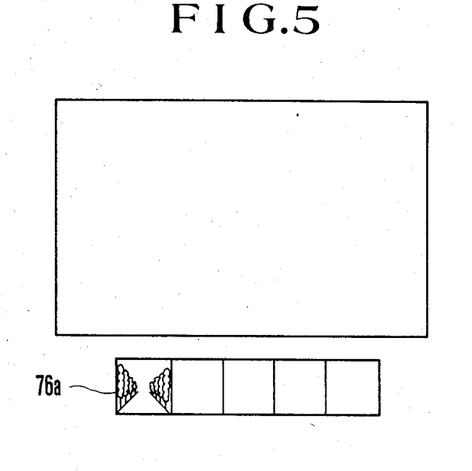
FIG. 5 is an illustration of the visual field of the view finder of the camera shown in FIG. 1 displaying a mode selected.
Figure 6:
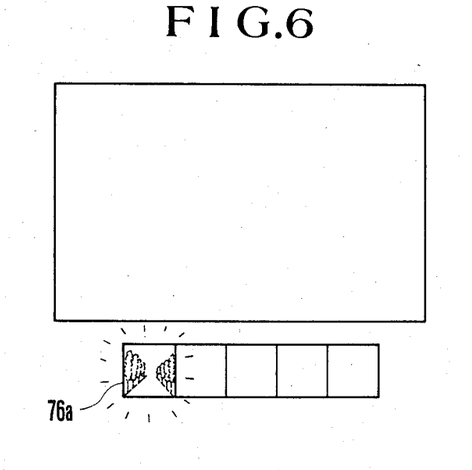
FIG. 6 is an illustration of the visual field of the view finder of the camera shown in FIG. 1 showing that photography is impossible in the mode selected.

Photography in the pan-focus mode A is as follows: The control circuit is set in the pan-focus mode A with the exposure control mode selection button 74 depressed as has been described above. The pictograph display part 76a is displayed at the view finder display as shown in FIG. 5. In the case of object's brightness EV=16, the aperture value and the shutter time value are respectively set at F=22 and T=1/250 sec. A photograph having an adequate exposure and a pan-focus effect can be obtained with the shutter of the camera released under this condition. However, when the object's brightness is either less than EV=12 or above EV=20, the condition deviates from the range of the effect of the program line part A. In that case, the exposure control mode display part 73a and the view finder display part 76a flicker informing the photographer that it is impossible to take a photograph having the pan-focus effect. The condition of the view finder display part 76a at that time is shown in FIG. 6.

An operation in the stop motion mode B is as follows: The camera is set in the stop motion mode B by depressing the exposure control mode selection button 74 as described in the foregoing. The pictograph display parts 73b and 76b are displayed respectively at the external exposure control mode display arrangement 73 and the view finder display arrangement 76 indicating that the camera is set in the stop motion mode B. When the photographing object's brightness is EV=15, the shutter time is set at 1/1000 sec. and the aperture value at F=5.6 Shutter release under this condition gives a photograph having an appropriate exposure and the effect of the stop motion mode B. However, if the object's brightness is less than EV=10 or exceeds EV=20, the above condition is out of range of the effect of the program line part B. Therefore, the exposure control mode display part 73b and the view finder display part 76b flicker informing the photographer that it is impossible to take a photograph with the desired stop motion effect. Operations in the panning shot mode C and in the graduate mode D are similar to this. In these modes, the display parts 73c and 73d are displayed at the exposure control mode display arrangement 73 and the display parts 76c and 76d at the view finder display arrangement 76 respectively with the modes being set by depressing the exposure control mode selection button 74. Deviation from the effect of the program line part C or D then takes place for an object's brightness below EV=4 and above EV=15 in the panning shot mode C and for an object's brightness below EV=6 and above EV=15 in the gradate mode D. In such a situation the exposure control mode display parts 73c and 73d and the view finder display parts 76c and 76d respectively flicker informing the photographer that no photograph having the effects expected from these modes can be taken.

Figure 7:
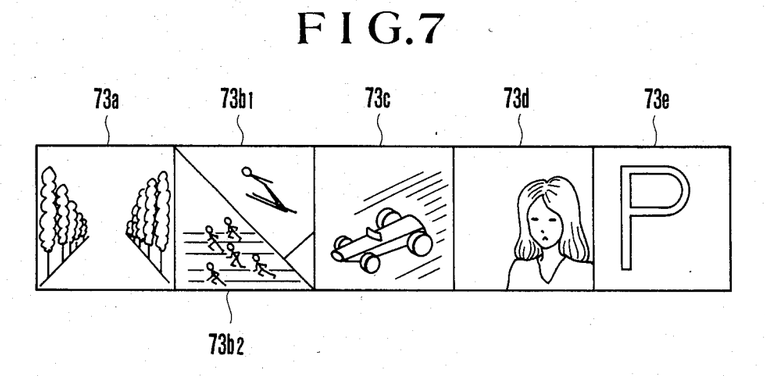
FIG. 7 is an illustration of another example of the mode display part of the camera shown in FIG. 1.

The above program lines for the exposure control modes are given by way of example. The expected picture effect is not always warranted 100 percent due to differences in the moving speed of the object, distance between a main object and the background thereof and the focal length of the lens 72 in use. In the case of the stop motion mode B, for example, the expected stop motion picture effect is not obtainable unless a high speed shutter time above 1/500 sec. is used for a high speed object such as a ski contest or a car race, while the stop motion effect can be sufficiently obtained at a shutter time value of 1/250 sec. or thereabouts for a running race of little children. It is difficult for a beginner to select the most suitable aperture value and shutter time in relation to the object to be photographed and the focal length of the lens 72. Therefore, it is necessary that an aperture value and a shutter time value that are most suited for obtaining the expected picture effect are combined to lessen the probability of failure in photographing many different objects even by a beginner. Furthermore, it is also possible to divide the same exposure control mode into two parts and to program each part different from the other. For example, in the stop motion mode B, the mode B is divided into two to program a shutter preference mode having a shutter time of 1/500 to 1/1000 sec. for the first divided part 73b1 and a shutter preference mode having a shutter time of 1/250 sec. for the other divided part 73b2, as shown in FIG. 7. Each of the other modes can also be divided in the same manner.

In the example given above, the lens 72 of a maximum aperture value of F=2 and a minimum aperture valve of F=22 is used. In cases where the lens 72 of a maximum aperture value is F=4 or F=5.6 and a minimum aperture value is F=16 or F=11, the camera which is arranged as in the foregoing does not operate satisfactorily because the program lines are fixed in the camera. It is possible, however, to set the program line part A for the minimum aperture value of the lens 72 to be used or to set the program line part D for the maximum aperture value thereof.

Next, when the light measurement button 75 is depressed, light measurement is carried out by means of a light sensitive element which is not shown but is provided inside the camera. Then, the exposure control mode display parts 73a, 73b, 73c, 73d and 73e and the view finder display parts 76a, 76b, 76c, 76d and 76e appear and all display modes other than the modes that are within an automatic exposure control range flicker according to the brightness of the object to be photographed, as shown in Table 1. This informs the photographer of the mode in which photography can be accomplished.

TABLE 1

| EV values | Exposure control mode display parts that flicker | View finder display parts that flicker |
|---|---|---|
| Below 1 | 73a; 73b; 73c; 73d and 73e | 76a; 76b, 76c; 76d and 76e |
| 1-4 | 73a; 73b; 73c and 73d | 76a; 76b; 76c and 76d |
| 5 | 73a; 73b and 73d | 76a; 76b and 76d |
| 6-10 | 73a and 73b | 76a and 76b |
| 11-12 | 73a | 76a |
| 13 | | |
| 14 | 73d | 76d |
| 15-19 | 73c and 73d | 76c and 76d |
| Above 20 | 73a; 73b; 73c; 73d and 73e | 76a; 76b; 76c; 76d and 76e |

In the specific embodiment which has been described above, the flickering actions of the pictograph display parts indicate the modes in which no photograph having the expected picture image effect can be taken when the light measurement button is depressed. However, conversely the flickering may indicate solely the modes in which photographs can be taken with the expected effects when the light measurement button 75 is depressed.

Figure 9:
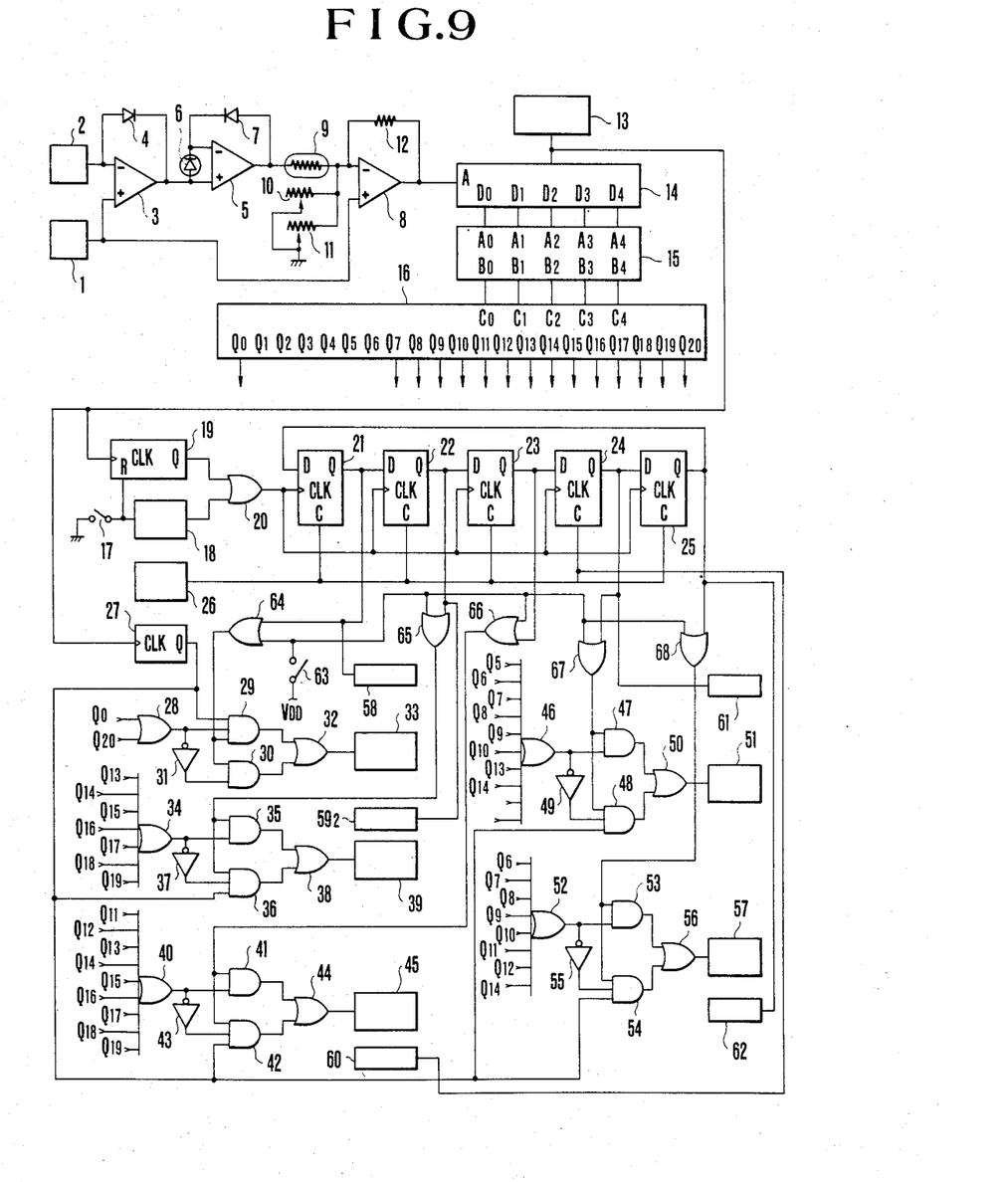
FIG. 9 is a circuit diagram showing the control circuit of the camera of FIG. 1.

Referring now to FIG. 9 which shows the control circuit arrangement of the camera shown in FIG. 1, a constant voltage source 1 supplies a bias voltage to the non-inversion input terminal of each of the operational amplifiers 3 and 8. The circuit arrangement includes a constant current source 2; the operational amplifiers 3, 5 and 8 (hereinafter each of operational amplifiers will be called OP amp for short); diode 4 for temperature compensation; a photo diode 6 which produces a photo current in proportion to the brightness of the object to be photographed; a diode 7 for logarithmic suppression; a posistor 9; an SV information resistor 10 supplying information proportional to the sensitivity of the film in use; an AVO information resistor 11 supplying information on the minimum aperture F value (full aperture) of the lens 72 mounted on the camera body; a resistor 12 for a known light measurement circuit which is formed jointly by these elements 1–12; a pulse generator 13 produces reference pulses; an A/D converter 14 converts an analog voltage received at the terminal A thereof into a digital value of 5 bits D0–D4; and an A/D memory circuit 15 receives at its terminals A0–A4 the digital value produced from the A/D converter 14 and produces memory values corresponding to the terminals A0–A4 to its terminals B0–B4. Upon completion of every analog-to-digital converting action, the output of the A/D converter 14 is transferred to the A/D memory circuit 15 to renew the memory value of the memory circuit 15. The terminals B0–B4 of the memory circuit 15 are connected to the terminals C0–C4 of a decoder 16 of 5 bits. One of the output terminals Q0–Q20 of the decoder 16 is selected according to the digital value. Since the input to the decoder 16 is 5 bits, there exist 32 bits. However, for the reason which will be described later herein, higher 11 bits are not used.

A control mode change-over switch 17 operates in response to the operation of the mode selection button 74, which is shown in FIG. 1. A one shot multivibrator 18 is connected to an OR gate 20 and produces a pulse from the output terminal thereof when the switch 17 is turned on. A counter 19 receives at its terminal CLK the reference pulses from the pulse generator 13. When a prescribed number of pulses have been counted, the level of the terminal Q of the counter 19 changes from a low level (hereinafter called an L level) to a high level (hereinafter called an H level). The switch 17 is connected to reset terminal R of the counter 19. The counting action of the counter 19 is not performed when the switch 17 is off and is performed when the switch 17 is turned on. The output of the OR gate 20 is impressed on the terminals CLK of D type flip-flops 21–25. Terminals D and Q of each of these flip-flops 21–25 are input and output terminals. When, the H level input is impressed on preset terminal P of the flip-flop 21, the level of the terminal Q becomes an H level. When the H level inputs are impressed on clear terminal C of the flip-flops 22–25, the levels of the terminals Q of these flip-flops become 22–25 L levels. A power on clear circuit 26 produces pulses the level of which becomes high for a short period of time when the output of a camera power source, which is not shown, is impressed on the circuit 26. The pulses produced from the power on clear circuit 26 are impressed on the terminal P of the flip-flop 21 and the terminals C of the flip-flops 22–25. A counter 27 has the reference pulses from the pulse generator 13 impressed on the terminal CLK thereof in the same manner as the counter 19. The level of the terminal Q of the counter 27 changes from an L level to an H level after a prescribed number of the reference pulses have been counted. An OR gate 28 receives the outputs Q0 and Q20 of the decoder 16. The control circuit arrangement further includes AND gates 29 and 30; an inverter 31; an OR gate 32; a drive circuit 33 which drives the display parts 76e of FIG. 2, 73e of FIG. 3 and 78e of FIG. 8 and has its output terminal connected to these display parts; an OR gate 34 which receives the outputs Q13–Q19 of the decoder 16; AND gates 35 and 36; an inverter 37; an OR gate 38; a drive circuit 39 the output terminals of which are connected to the display parts 76a of FIG. 2, 73a of FIG. 3 and 78a of FIG. 8 and thus drive these display parts; an OR gate 40 receives the outputs Q11–Q19 of the decoder 16; AND gates 41 and 42; an inverter 43; an OR gate 44; a drive circuit 45 which has its output terminal connected to the display parts 76b of FIG. 2, 73b of FIG. 3 and 78b of FIG. 8 to drive them; an OR gate 46 which receives the outputs Q5–Q14 of the decoder 16; AND gates 47 and 48; an inverter 49; an OR gate 50; a drive circuit 51 which has its output terminal connected to the display parts 76c of FIG. 2, 73c of FIG. 3 and 78c of FIG. 8 and which drives them; and OR gate 52 which receives the outputs Q6–Q13 of the decoder 16; AND gates 53 and 54; an inverter 55; an OR gate 56; a drive circuit 57 which has its output terminal connected to the display parts 76d of FIG. 2, 73d of FIG. 3 and 78d of FIG. 8 and thus drives them; and program line selection circuits 58–62. One of the program lines for the modes A–E shown in FIG. 4 is selected by the selection circuits 58–62. The shutter speed T and the aperture value F are determined by the output of the OP amp 8 on the line. The circuit 58 selects the program line of the normal mode E of FIG. 4; the circuit 59 selects the program line of the pan-focus mode A; the circuit 60 selects the program line of the mode stop-motion B; the circuit 61 selects the program line of the panning shot mode C; and the circuit 62 selects the program line of the gradate mode D of FIG. 4. A light measurement switch 63 has one terminal thereof connected to a power source VDD. When the light measurement switch 63 turns on in response to depressing the light measurement button 75, a power source switch, which is not shown also turns on to supply power to each applicable part. OR gates are identified by reference numerals 64–68. One of the input terminals of each of these OR gates 64–68 is connected to the other terminal of the light measurement switch, which is not connected to the power source.

Figure 8:
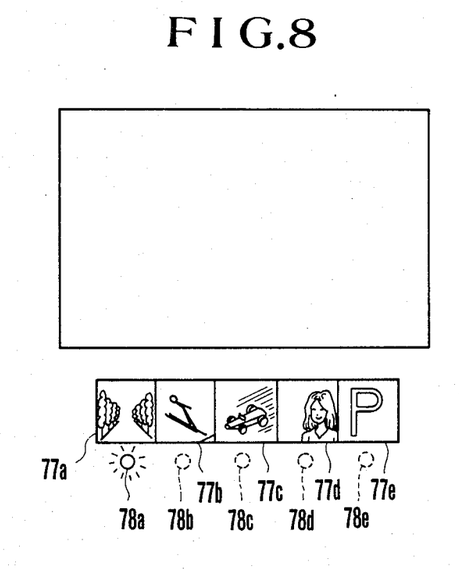
FIG. 8 is an illustration of a view finder visual field showing the mode display part of the camera of FIG. 1.

Furthermore, referring to FIG. 8, a warning for the exposure control mode may be given by flickering lamps 78a–78e such as LED's which correspond to the pictographs 77a–77e shown in FIG. 8.

The embodiment which is arranged as above operates in the following manner: The light measurement circuit, which consists of the elements 1–12 and is arranged in a known manner, does not require detailed description thereof. First, a photo current which corresponds to the brightness of the object to be photographed flows through the photo diode 6. The photo current is logarithmically suppressed by the OP amp 5 and the logarithmic suppression diode 7. Furthermore, the output of the temperature compensation circuit which is composed of the constant current circuit 2, the diode 4 and the OP amp 3 is impressed on the non-inversion input terminal of the OP amp 5 to offset the saturation currents in the suppressing direction of the diodes 4 and 7, which have the same characteristics. Accordingly, the output of the OP amp 5 logarithmically suppresses the object's brightness and also has a voltage proportional to the absolute temperature. This voltage is processed through the posistor 9, the resistor 12 and the OP amp 8 to make the output of the OP amp 8 into a logarithmically suppressed value that is independent from the temperature of the object's brightness. Then, the SV information resistor 10 and the AVO information resistor 11 respectively supply the film sensitivity information and the maximum F value information of the lens 72 to further make the output of the OP amp 8 into a voltage corresponding to an exposure light quantity EV. However, the light measurement range is from EV 0 to EV 20. The voltage thus obtained is impressed on the terminal A of the A/D converter 14 which uses the output of the pulse generator 13 as reference pulses. The A/D converter 14 then (analog-to-digital) converts the voltage and produces the digital value thereof at the terminals D0–D4. In other words, the digital value produced at the terminals D0–D4 of the A/D converter 14 corresponds to the value EV. The digital value is transferred to the terminals A0–A4 of the A/D memory circuit 15 every time the A/D converter 14 completes an A/D converting action. The digital value is thus stored and kept at the memory circuit 15. The stored value is produced from the terminals B0–B4 of the A/D memory circuit 15 and is impressed on the terminals C0–C4 of the decoder 16. The decoder 16 decodes the binary code of the terminals C0–C4 thereof and produces outputs Q0–Q20. In this instance, since the light measurement range is from brightness EV 0 to brightness EV 20 as mentioned in the foregoing, other outputs Q21–Q31 of the decoder 16 remain unused and are thus omitted from the illustration. Furthermore, the outputs Q0–Q20 respectively correspond to the values EV 0–EV 20.

When the power supply of the camera is turned on by a switch which is not shown, the power on the clear circuit 26 produces an H level pulse for a short period of time and is impressed on the terminal P of the D type flip-flop 21 and the terminals C of the D type flip-flops 22–25. This results in an H level output Q of the D type flip-flop 21 and L level outputs Q of the D type flip-flops 22 and 25. This condition remains unchanged unless the switch 17 is turned on. When the switch 17 which corresponds to the switch 4 shown in FIG. 1 is once operated on and off, the one-shot multivibrator 18 produces a one-shot pulse, which is supplied via the OR gate 20 to the terminals CLK of the D type flip-flop group 21–25. Then, in synchronization with the pulse rise, the output Q of the D type flip-flop 21 becomes an L level and the output Q of the D type flip-flop 22 an H level while the outputs Q of the rest of the D type flip-flop group 23–25 remain at the L level. In other words, the H level of the output Q of the flip-flop 21 is moved to the output Q of the flip-flop 22. Furthermore, if the switch 17 is once again turned on and off, the one-shot multivibrator 18 likewise produces another one-shot pulse causing the H level of the output Q of the D type flip-flop 22 to move to the output Q of the D type flip-flop 23. Following this, every time the switch 17 turns on, the sole H level of one of the outputs Q of the D type flip-flop group 21–25 shifts from one flip-flop to another toward the flip-flop 25 and then from the flip-flop 25 back to the first flip-flop 21 repeating the same process. Since the reset terminal R of the counter 19 is connected to the switch 17, the counter 19 is in a reset condition and its output Q remains at an L level when the switch 17 is off. When the switch 17 is once turned on and then is quickly turned off, the counter 19 might begin to count according to the reference pulses from the pulse generator 13. However, since the counter 19 is reset before the output Q level thereof becomes high, the output Q level of the counter 19 remains low in the same manner as when the switch 17 remains off. However, if the switch 17 is allowed to be continuously on over a period exceeding a predetermined length of time, the counter 19 performs a counting action and its output Q repeats alternately becoming H and L levels in a prescribed cycle. Since the output Q of the counter 19 is impressed via the OR gate 20 on the terminals CLK of the D type flip-flop group 21–25, the H level of the output Q of the D type flip-flop 21 at the beginning of the power supply shifts to other D type flip-flops in such a manner as 22→23→24→25→21→ . . . one after another at fixed time intervals, as mentioned in the foregoing. Furthermore, when the switch 17 turns off after it has been continuously on, the counter 19 is reset. Then, the output Q of one of the D type flip-flops 21–25, which is at an H level when the switch 17 turns off, remains at the H level.

When the power supply is turned on, since at that time the output Q of the D type flip-flop 21 among the group 21–25 is solely in an H level, the program line selection circuit 58 to which the output terminal Q of the flip-flop 21 is connected is selected. With the program line selection circuit 58 thus selected, the shutter speed or time T and the aperture value F of the F-number are determined on a program line part E of FIG. 4 according to the value EV, i.e. the output of the OP amp 8. If the valve EV is then between 1 and 19, the decoder 16 selects one of the outputs Q1–Q19. Therefore, the output of the OR gate 28 is at the L level and accordingly the output of the inverter 31 becomes the H. Accordingly, the output of the AND gate 29 becomes L and that of the AND gate becomes H actuating the drive circuit 33 through the OR gate 32. With the drive circuit 33 thus actuated, the display parts 76e of FIG. 2 and 73e of FIG. 3 or 78e of FIG. 8 light up indicating the program mode selected. When the value EV is either 0 or 20, that is, if it deviates from the program line part E of FIG. 4, the decoder 16 produces the output Q0 or Q20. This causes the output level of the OR gate 28 to become high and that of the AND gate 30 to become low through the inverter 31. Meanwhile, since the reference pulses from the pulse generator 13 are impressed on the terminal CLK of the counter 27, the output of the counter 27 repeats, alternating between H and L levels. The output Q of the counter 27 is impressed on one of the input terminals of the AND gate 29. Therefore, the wave form of the AND gate 29 output becomes the same as that of the output Q of the counter 27. This signal is further impressed via the OR gate 32 on the drive circuit 33. This causes the display parts 76e of FIG. 2 and 73e of FIG. 3 or 78e of FIG. 8 to flicker, warning the camera operator that no appropriate photograph can be taken although the program line part E of FIG. 4 is selected.

When the switch 17 which corresponds to the switch 74 of FIG. 1 is allowed to be one for a short period, the output Q of the D type flip-flop 22 among the D type flip-flop group 21–25 alone becomes an H level, as has been described in the foregoing. This high level output causes the program line selection circuit 59 to select the program line part A of FIG. 4. In this instance, if the value EV is between 13 and 19, the output level of the OR gate 34 becomes H. The level of the AND gate 35 also becomes H. The H level output causes the drive circuit 39 to operate via the OR gate 38. With the drive circuit 39 thus operating, the display parts 76a of FIG. 2 and 73a of FIG. 3 or 78a of FIG. 8 light up informing the camera operator of the selection of the program line part A of FIG. 4. Furthermore, when the value EV is not within the range of 13 to 19, the output of the OR gate 34 becomes an L level, that of the inverter 37 an H level and that of the AND gate 36 the same wave form as the output Q of the counter 27. The signal thus obtained is transferred via the OR gate 38 to the drive circuit 39. The drive circuit 39 then causes the display parts 76a of FIG. 2 and 73a of FIG. 3 or 78a of FIG. 8 to flicker. Then, in the same manner as described above, the program line selection circuit 60 operates when the switch 17 is again on for a short period and by this the program line part B of FIG. 4 is selected. If the value EV is within the range of 11 to 19 at that instant, the display parts 76b of FIG. 2 and 73b of FIG. 3 or 78b of FIG. 8 light up. However, they flicker if the value EV is not within the range of 11 to 19. Then, when the switch 17 is again turned on for a short period, the program line selection circuit 61 selects the program line part C of FIG. 4. In that situation, if the value EV is within the range of 5 to 14, the display parts 76c of FIG. 2 and 73c of FIG. 3 or 78c of FIG. 8 light up. If the value EV is outside the above range, they flicker. When the switch 17 is again turned on for a short period, the program line selection circuit 62 selects the program line part D of FIG. 4. Then, the display parts 76d of FIG. 2 and 73d of FIG. 3 or 78d of FIG. 8 light up if the value EV is within the range of 6 to 13 or flicker if the value EV is outside the range. Then, if the switch 17 is once again turned on for a short period, the program line selection circuit 58 is selected once more and the embodiment goes back to the initial power supply condition.

In the above-described instances, the switch 17 is turned on for a brief period of time. If the switch 17 is continuously on, the H level of the output Q among the flip-flop group 21-25 shifts from one flip-flop to another in such a manner as 21→22→23→24→25→21→ . . . as has been described in the foregoing. The program line selection circuits 58-62 and the lighting-up and flickering displays are also switched over from one to another depending on the value EV. Meanwhile, the selection of the display drive circuits 33-57 also continues to change. The display parts 76a-76e of FIG. 2 and the display parts 73a-73e of FIG. 3 or the display parts 78a-78e of FIG. 8, which are connected to these display drive circuits, are thus operated one after another. When the camera operator selects one of the program lines while watching the displays, if the switch 17 is turned off when the display parts for the desired program line lights up or flickers, the camera is then stopped in the desired program line condition and an exposure can be accomplished at the shutter speed or time T and the aperture value F or F-number depending on the value EV.

When the light measurement button 75 of FIG. 1 is depressed, the light measurement switch 63 turns on and at the same time a power supply switch, which is not shown, also turns on to supply power to applicable parts of the camera. With the switch 63 turned on, the outputs of the OR gates 64-68 become H levels. If at that instant, the exposure light value EV is 12, for example, the output Q12 of the decoder 16 alone becomes an H level among other outputs of the decoder 16. Therefore, the outputs of the OR gates 28 and 34 become L levels and those of the OR gates 40, 46 and 52 become H levels. Regarding the display conditions of the display parts 76e of FIG. 2 and 73e of FIG. 3 or 78e of FIG. 8, the outputs of the AND gate 30 and the OR gate 32 become H levels as the output level of the inverter 31 is high; the signal thus obtained is then impressed on the drive circuit 33 to light up the display parts 76e and 73e or 78e and thus informs the camera operator that an appropriate photograph can be taken with the program line part E of FIG. 4. As for the display condition of the display parts 76a of FIG. 2 and 73a of FIG. 3 or 78a of FIG. 8, the output of the inverter 37 becomes H while, since the reference pulses from the pulse generator 13 are impressed on the terminals CLK of the counter 27, the output Q of the counter 27 repeats alternately becoming H and L levels in a prescribed cycle. Therefore, the wave form of the outputs of the AND gate 36 and the OR gate 38 are the same as that of the output Q of the counter 27. With this output of the OR gate 38 impressed on the drive circuit 39, the display arrangements 76a and 73a or 78a flicker warning the camera operator that no appropriate photograph can be taken when the program line part A of FIG. 4 is selected. In the case of the display parts 76b and 73b or 78b, the output levels of the AND gate 42 and the OR gate 44 become H. The signal thus obtained is impressed on the drive circuit 45 lighting up the display parts 76b and 73b or 78b. With regard to the display parts 76c and 73c or 78c, the levels of the AND gate 47 and OR gate 50 become H and the signal thus obtained is impressed on the drive circuit 51 lighting up the display parts 76c and 73c or 78c. As for the display parts 76d and 73d or 78d, the output levels of the AND gate 53 and OR gate 56 become H. The signal thus obtained from the OR gate 56 is impressed on the drive circuit 57 to also light up the display parts 76d and 73d or 78d. In short, among the display parts of FIGS. 2, 3 and 8, only the display parts 76a, 73a and 78a flicker while all other display parts light up. This effectively informs the camera operator beforehand that appropriate photographs can be taken with the use of any of the program line parts B, C, D and E of FIG. 4 with the exception of the program line part A. While the above description has covered an instance wherein the value EV is 12, the display conditions for other EV values are shown in Table 1.

Figure 10:
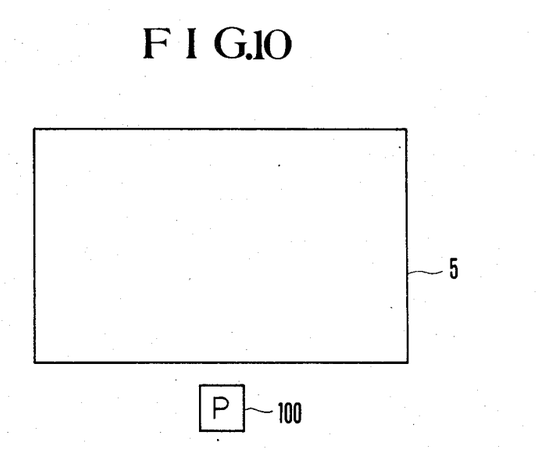
FIG. 10 is an illustration of a view finder visual field showing a mode display modification of the camera of FIG. 1.
Figure 11:
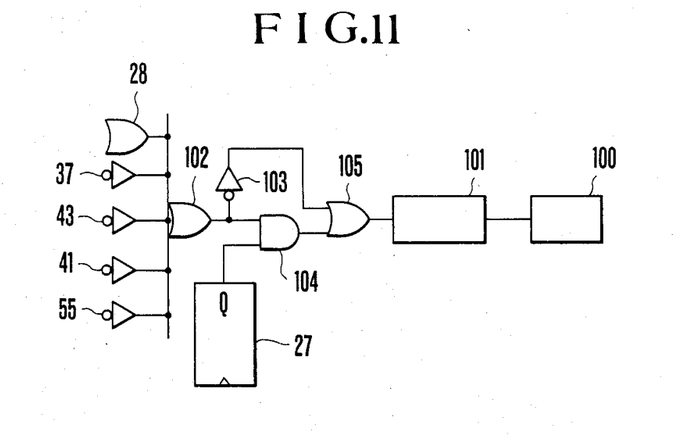
FIG. 11 is a circuit diagram showing a display circuit arrangement suited for the display arrangement of FIG. 10.

FIGS. 10 and 11 show another embodiment of the invention wherein the view finder display parts of FIG. 2 and the circuit arrangement thereof are simplified. In this situation, the display parts 76a-76e of FIG. 2 are consolidated into one display device 100, which gives all the warnings mentioned in the foregoing. Referring to FIG. 11, the circuit arrangement includes an OR gate 102 which is connected to the OR gate 28 and the inverters 37, 43, 49 and 55 of FIG. 9; an inverter 103; an AND gate 104; an OR gate 105; the counter 27 which is also shown in FIG. 9; and a drive circuit 101 which has its output terminal connected to the display device 100 and thus drives the display device 100. The simplified arrangement, which accomplishes the functions of the display parts 76a-76e singly by means of the display device 100, is not only advantageous in terms of cost and space but also obviates the complication of the view finder.

Furthermore, in FIG. 9, the high level output of the flip-flop group 21-25 is shifted every time the switch 17 is depressed once. This arrangement involves the provision of circuits 17, 18, 19 and 20. However, the arrangement may be replaced with another arrangement shown in FIG. 12.

Figure 12:
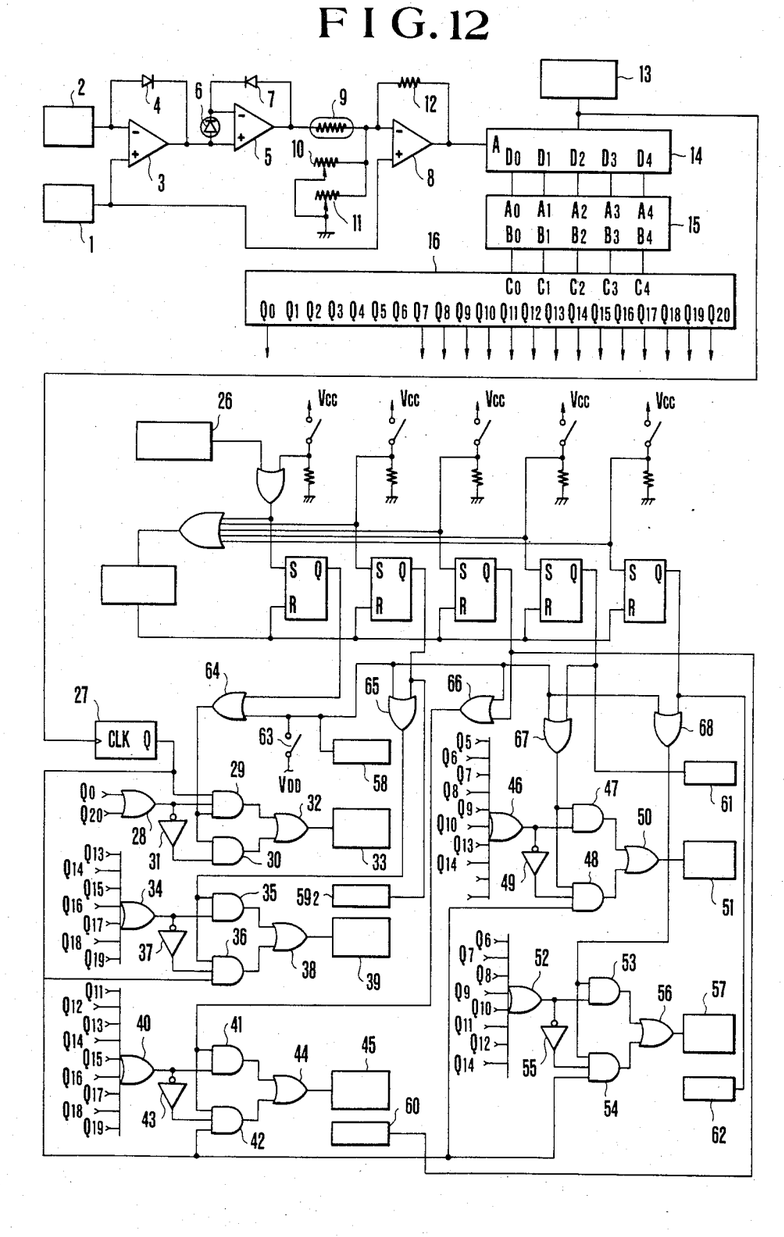
FIG. 12 is a circuit diagram showing a control circuit of the camera shown in FIG. 9.
Figure 13:
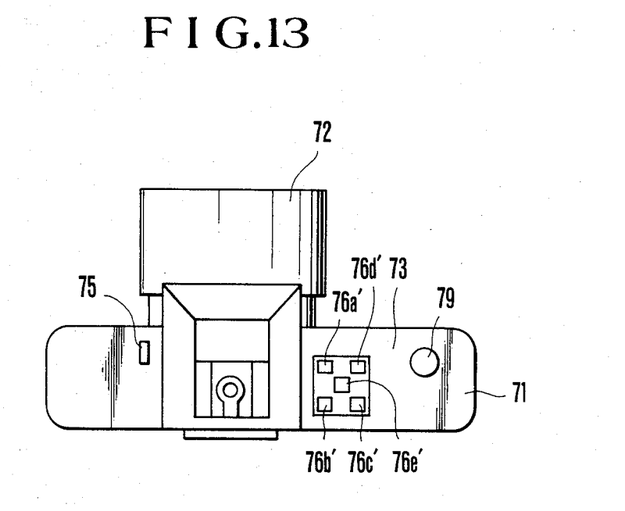
FIG. 13 is a plan view of a camera having the circuit shown in FIG. 12.

Then, this modification permits utilization of the external display parts 76a', 76b', 76c', 76d' and 76e' also as operation buttons, as shown in FIG. 13. More specifically, in this case, the D type flip-flops 21-25 are replaced with SR type flip-flops 21'-25'. The set terminals S of the flip-flops 21'-25' are connected to connection points between switches $17_1$, $17_2$, $17_3$, $17_4$ and $17_5$ and resistors R1, R2, R3, R4 and R5. The flip-flop 21' alone has an OR gate OR1 inserted for its set terminal S. The OR gate OR1 has the power up clear circuit 26 connected to the input terminal thereof. The connection points between the switches $17_2$, $17_3$, $17_4$ and $17_5$ and the resistors R2, R3, R4 and R5 and the OR gate OR1 are connected to a monostable multivibrator M through an OR gate OR2. The output terminal of this monostable multivibrator M is connected to the reset terminals R of the flip-flops 21'-25'. Furthermore, the monostable multivibrator M produces pulses the duration of which are sufficiently shorter than the length of time during which the switches $17_1$, $17_2$, $17_3$, $17_4$ and $17_5$ are depressed.

When the power up clear circuit 26 produces the pulse, the pulse is applied to the reset terminals R of the flip-flops 21'-25' through the OR gates OR1 and OR2 and the monostable multivibrator M. These flip-flops 21'-25' are thus reset by the pulse. Meanwhile, since the duration of the pulse from the monostable multivibrator M is sufficiently short, the flip-flop 21' is alone set by the pulse of the power up clear circuit 26. When the operation button-and-display element 76c' is operated, the switch $17_3$ is closed producing the pulse of the monostable multivibrator M, thereby resetting the flip-flops 21'-25'. Since the duration pulse of the monostable multivibrator M pulse is sufficiently shorter than the length of time required for closing the switch $17_3$, the flip-flop 23' is instantaneously set. Other details of operation are identical with those of the embodiment shown in FIG. 9 and, therefore, do not require further description here.

In accordance with the present invention, as has been described previously, the picture effects obtainable from different exposure control modes are displayed by means of pictographs, so that an exposure mode for a desired picture effect can be readily selected. Furthermore, the pictographs representative of picture effects are displayed both inside and outside the view finder. In situations where the selected exposure control mode would result in a picture effect contrary to that which is desired by the photographer, the photographer is warned by the flickering display of the corresponding pictograph. Therefore, even a beginner is able to take a photograph using the correct exposure for a desired picture effect. The invention thus eliminates the possibilities of incorrect exposure and an undesirable picture effect.

Furthermore, in accordance with the invention, the pictograph, representative of an exposure control mode in which adequate photography is impossible due to the brightness of the object to be photographed, is a flickering display informing the photographer of the improper exposure control mode. This is a great advantage of the present invention.

What we claim:
1. An exposure control device for a camera, comprising:
   exposure control means having a plurality of program lines which have programmed combinations of aperture values and shutter times, wherein each line of said plurality of program lines of the exposure control means is different from each other;
   display means having a display part to display a picture effect obtainable by said program lines with a pictograph, said means having such plurality of display parts as corresponding to a number of the program lines;
   light measuring means for measuring a brightness of an object to be photographed, said light measuring means being arranged to produce an electrical signal corresponding to the brightness of said object;
   selector means for selecting one program line out of said plurality of program lines and displaying a display part corresponding to the selected program line, wherein the selection operation of said selector means is guided by a pictograph which provides a concrete idea of a picture effect obtainable through said display part of said display means; and
   control means for controlling a display action of each display part of said display means, said control means controlling the display of the display part corresponding to the program line selected by said selector means and receiving an output signal from said light measuring means to vary the display of the display part corresponding to the selected program line in cases where the brightness of an object does not give the picture effect expected from said program line selected by the selector means.

2. A camera according to claim 1, wherein said control means is arranged to cause said display part to flicker in cases where the brightness of the object would not give the picture effect expected from the selected program line.

3. A camera according to claim 1, wherein said selector means is provided with a switch and is arranged to be rendered operative by the switching action of said switch.

4. A camera according to claim 1, wherein said display means has a display part with pictographs and a part in which a display state is varied.

5. An exposure control device of a camera, comprising:
   exposure control means having a plurality of program lines which have programmed combinations of aperture values and shutter times, wherein each line of said plurality of program lines is different from each other;
   display means having display parts to display a picture effect obtainable by said program lines with a pictograph, said display means having a plurality of display parts corresponding to the number of the program lines;
   light measuring means for measuring a brightness of an object to be photographed, said means producing electrical signals corresponding to said object brightness;
   selector means for selecting one program line out of the plurality of said program lines and causing a display part corresponding to the selected program line to make a display, wherein the selection operation of said selector means is guided by a pictograph which provides a concrete idea of a picture effect obtainable by the display part of said display means;

first control means making display controls of the display part corresponding to the program line selected by the selector means, said control means being arranged to receive an output signal from the light measuring means and to vary a display state of the display part corresponding to the selected program line in cases where the brightness of an object would not give the picture effect expected from said program line selected by the selector means; and second control means for controlling display actions of each display part of the display means, said second control means being arranged to receive an electrical signal from the light measuring means and to discriminate a program line or lines that would give the picture effect expected therefrom among the plurality of program lines from other program lines that would not give the same due to the object brightness by discriminatingly varying the display states of the plurality of display parts.

6. An exposure control device for a camera, comprising:

a first display means having a plurality of displaying parts for displaying various kinds of picture effects by a photograph;

a second display means for a warning display;

exposure control means having a plurality of program lines programmed with a combination of a diaphragm value and a shutter value, said plurality of program lines being present at least in a number corresponding to the number of the displaying parts which display pictographically the picture effects produced by the program lines;

light measuring means for measuring the brightness of an object, said means producing an electrical signal corresponding to the brightness of the object;

selection means for selecting one program line from the plurality of program lines, the selecting operation of said selection means being guided by a pictograph causing a specific association of the picture effect of the displaying part of the first display means; and control means for controlling the displaying operation of the second display means, said control means receiving an output signal from the light measuring means, changing the displaying condition of the second display means in case the picture effect of the program line selected by the selection means is not obtained and said second display means changing the displaying condition in case any program line is selected, but no picture effect can be obtained by the selected program line.

7. An exposure control means for a camera, comprising:

a first display means having a plurality of displaying parts for displaying various kinds of picture effects by a photograph;

exposure control means having a plurality of program lines programmed with a combination of a diaphragm value and a shutter value, said plurality of program lines being present at least in a number corresponding to the number of the displaying parts which display pictographically the picture effects produced by the program lines;

light measuring means for measuring the brightness of an object, said means producing an electrical signal corresponding to the brightness of the object;

selection means for selecting one program line from the plurality of program lines and causing one displaying part corresponding to the selected program line to display, the selecting operation of said selection means being guided by a pictograph causing a specific association of the picture effect of the displaying part of the first display means; and control means for controlling the displaying operation of each of the displaying parts of the display means, said control means controlling display of the displaying part corresponding to the program line selected by the selection means, receiving an output signal from the light measuring means, and changing the displaying condition of the displaying part corresponding to the selected program line in case no picture effect is obtained by the program line selected by the selection means.

* * * * *